(12) United States Patent
Shelby

(10) Patent No.: US 6,357,578 B1
(45) Date of Patent: Mar. 19, 2002

(54) TRAILER FLOOR CLEANING SYSTEM

(75) Inventor: David E. Shelby, Quesnel (CA)

(73) Assignee: Edgemount Manufacturing Ltd., Quesnel (CA)

( * ) Notice: Subject to any disclaimer, the term of this patent is extended or adjusted under 35 U.S.C. 154(b) by 0 days.

(21) Appl. No.: 09/517,875

(22) Filed: Mar. 2, 2000

(51) Int. Cl.[7] .................................................. B60P 1/00
(52) U.S. Cl. ............................. 198/750.2; 198/750.1; 198/727; 198/717; 198/498; 414/509; 414/525.1; 414/525.6
(58) Field of Search ............................. 198/498, 717, 198/727, 750.1–750.5; 414/509–517, 525.1, 525.2, 525.3, 525.6, 525.9

(56) References Cited

U.S. PATENT DOCUMENTS

| 2,536,476 A | 1/1951 | Thompson |
| 3,050,203 A | 8/1962 | De Biasi |
| 3,333,715 A | 8/1967 | Hepburn et al. |
| 3,422,973 A | * 1/1969 | Longman ..................... 41/511 |
| 3,465,902 A | * 9/1969 | Colletti ....................... 414/679 |
| 3,815,764 A | 6/1974 | Gilfillan et al. |
| 4,143,760 A | 3/1979 | Hallstrom |
| 4,492,303 A | 1/1985 | Foster |
| 5,009,564 A | 4/1991 | Lutz et al. |
| 5,314,290 A | 5/1994 | Lutz et al. |
| 5,395,204 A | 3/1995 | Balik |

* cited by examiner

Primary Examiner—Christopher P. Ellis
Assistant Examiner—Mark A. Deuble
(74) Attorney, Agent, or Firm—Dellett and Walters

(57) ABSTRACT

A system for cleaning the floor of a self-unloading trailer of residual particulate material comprises in combination with moving slats of a typical self-unloading trailer three rails each fashioned to be attached to the top of a slat, and a wedge-shaped sweeper having skates on a lower portion to ride along said rails. The sweeper rides along the rails by means of skate assemblies having pawls which may ratcheting along teeth formed in the rails as the sweeper moves rearwardly in the trailer. A control system sends signals to a motor contained within the sweeper to engage and disengage the pawls, and to a winch to draw the sweeper back to a starting position following operation.

9 Claims, 8 Drawing Sheets

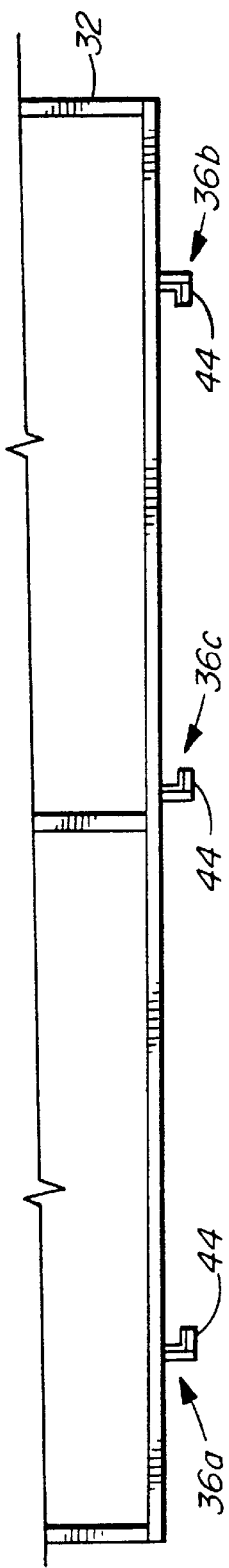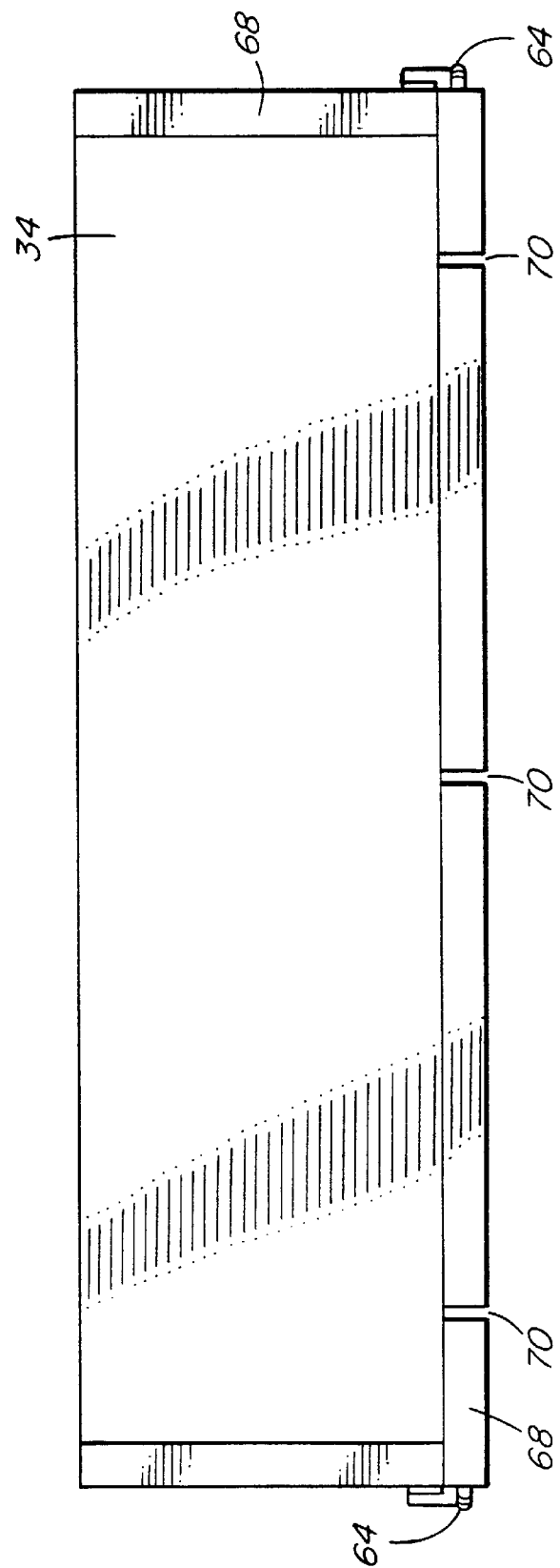

TRAILER FLOOR CLEANING SYSTEM

TECHNICAL FIELD

This invention relates to trailers of the type used to haul particulate material, and more particularly, to a system for automatically cleaning residual material from the floor of a self-unloading trailer.

BACKGROUND

It has become commonplace to employ what is often referred to as a "moving floor" or "walking floor" load-moving system in the trailers of so-called "self-unloading" trucks used to carry goods like wood chips, sawdust, grains, etc.

Such floors typically comprise a plurality of adjacent slats which lie longitudinally along the length of the trailer floor and which, through a series of repetitive reciprocating sliding movements, carry the load out the rear of the trailer. One example of such a floor is the system described in U.S. Pat. No. 4,143,760. Another example is shown in U.S. Pat. No. 4,492,303.

Although such unloading systems are now commonplace, one inherent problem with them which has not yet been satisfactorily addressed is that such systems leave a good deal of residual material on the floor of the trailer. Such residual material must be manually shovelled or swept out of the trailer by the operator, causing time delays and other inconvenience. This encourages operators to try to clear the trailer of residual material while the load is being unloaded, which is very dangerous.

While there exist load handling systems which comprise movable bulkheads for pushing loads out of a trailer (such systems are shown, for example, in U.S. Pat. Nos. 2,536,476, 3,333,715, 3,050,203, 3,815,764, 5,395,204, 5,009,564 and 5,314,290), these systems are not directed to cleaning residual material out of the bed of a self-unloading trailer, and are not fashioned to meet this objective, as is the present invention.

SUMMARY OF INVENTION

The present invention is a trailer floor cleaning system for use in a self-unloading trailer having a front, a rear, side walls, and a reciprocating floor conveyor system having a plurality of reciprocable slats. The invention comprises, in one embodiment, a plurality of rails each extending upwardly from the top surface of one of the plurality of slats within the trailer, each rail defined by a plurality of contiguously-aligned fin-like teeth defining, notches between adjacent ones of them.

The invention also comprises a wedge-shaped sweeper mounted on these rails. The sweeper comprises a frame, a covering attached to the frame and enclosing it, a plurality of skate assemblies each attached to a lower portion of the frame and depending downwardly from it, each of the assemblies fashioned to slide along one of the rails, and motive means for moving the sweeper from the front of the trailer towards the rear of the trailer along the rails.

In a further embodiment of the invention, the skate assemblies comprise pivotable pawls and the motive means for moving the sweeper from the front of the trailer towards the rear of the trailer along the rails comprises the pawls acting in ratcheting engagement with the teeth of the rails.

Three rails are used in a preferred embodiment: a central rail extending upwardly from the top surface of a central slat, and two outer rails, each extending upwardly from the top surface of an outer slat near a side wall of the trailer. The outer slats when the floor is in operation reciprocate in unison with one another, but out of unison with the central slat.

To retrofit the system into an existing trailer with a reciprocating floor, the rails can comprise an angle having a flat horizontal portion for attachment to the top surface of a slat and a substantially vertical portion attached to the horizontal portion and extending upwardly therefrom. Such rails can be welded or epoxied to the surfaces of the slats.

BRIEF DESCRIPTION OF DRAWINGS

In drawings which illustrate a specific embodiment of the invention, but which should not be construed as restricting the spirit or scope of the invention in any way:

FIG. 4 is a front view of the bottom portion of the sweeper shown in FIG. 3.

FIG. 5 is a front view of the sweeper shown in FIG. 4, covered.

DESCRIPTION

Figure 1:
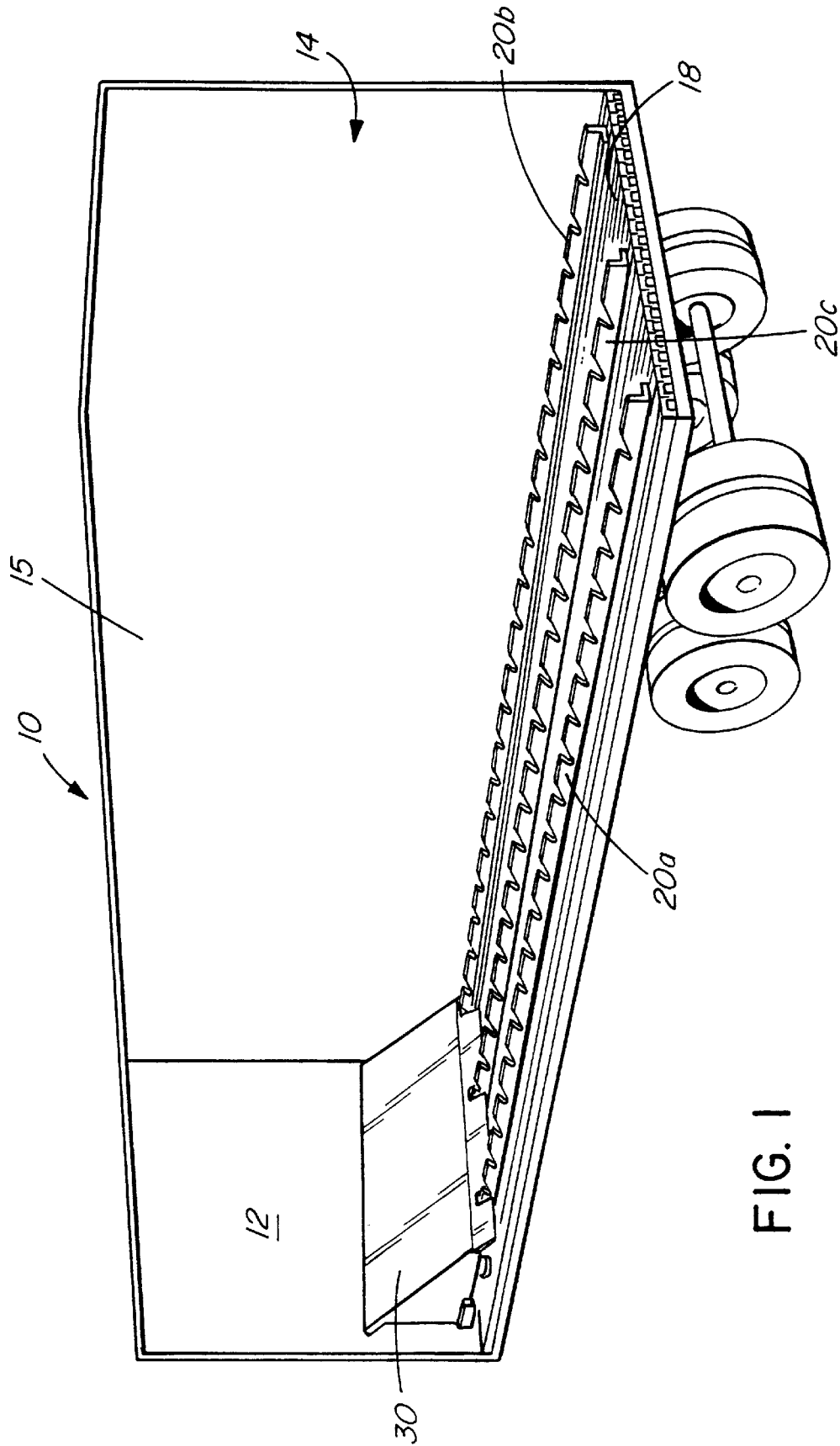
FIG. 1 is a fragmentary view of a self-unloading trailer containing the floor cleaning system made in accordance with one embodiment of the present invention.

Referring first to FIG. 1, a typical self-unloading trailer 10 has a front end 12, a rear end 14 through which a load may be emptied, a right-side wall 15, a left-side wall (not shown), and a reciprocating floor conveyor system 18 comprising a plurality of reciprocable slats.

As described in U.S. Pat. No. 4,492,303, which issued to R. K. Foster on Jan. 8, 1985, a reciprocating floor conveyor system 18 typically comprises three sets of slats, "1", "2" and "3" (as shown in FIGS. 2–6 of that patent). In operation, all three sets of slats move rearwardly at first (toward the rear end of the trailer), carrying the load in the trailer rearwardly with them.

Following this movement in unison, slat set "1" moves frontwardly (toward the front end of the trailer) relative sets "2" and "3", sliding under the load without moving it; then "2" moves frontwardly relative "1" and "3"; then "3" moves frontwardly relative sets "1" and "2". Then, all slats move rearwardly together again.

In the present invention, a plurality of notched rails are attached to the tops of some of the slats of such a reciprocating floor system, extending upwardly from the top surface thereof, as shown in FIG. 1. In a preferred embodiment, there exist three such rails, outer rails 20*a*, 20*b* attached to the top surface of slats positioned near the side walls of the trailer, and a central rail 20*c*, attached to the surface of a slat positioned at or near the center of trailer 10.

In a preferred embodiment, outer rails 20a, 20b are attached to slats which move in unison (for example, set "1" slats). Central rail 20c is attached to a slat which does not move in unison with these two slats (ie. either a set "2" or a set "3" slat). Thus, rails 20a, 20b and 20c reciprocate along with their associated slats as the slats reciprocate rearwardly and forwardly.

While such rails 20a, 20b, 20c could be integrally formed with the slats, it has been found convenient to form the rails from metal angle, preferably made of aluminum, to allow for the retrofitting of the system into existing self-unloading trailers.

In a preferred embodiment, notches are cut along one edge of the angle, forming a plurality of aligned fin-like teeth 22 (FIG. 6) in one face of the angle. The other face of the angle is fixed, for example, by welding, or by epoxy, to the top surface of the desired slat so that teeth 22 extend upwardly therefrom, forming a aligned row. Each one of teeth 22 has a gradually sloping portion 24, sloping upwardly towards the rear 14 of trailer 10, a horizontal portion 26, and a steeply sloping portion 28 which preferably slopes back towards the front of the trailer at an angle obtuse to horizontal.

As also shown in FIG. 1, the invention also comprises in combination with rails 20a, 20b and 20c a generally wedge-shaped sweeper 30 slidably mounted onto rails 20a, 20b and 20c. Sweeper 30 comprises a frame 32 (FIG. 2) having a number of attached members, and a covering 34 (FIG. 5).

Figure 2:
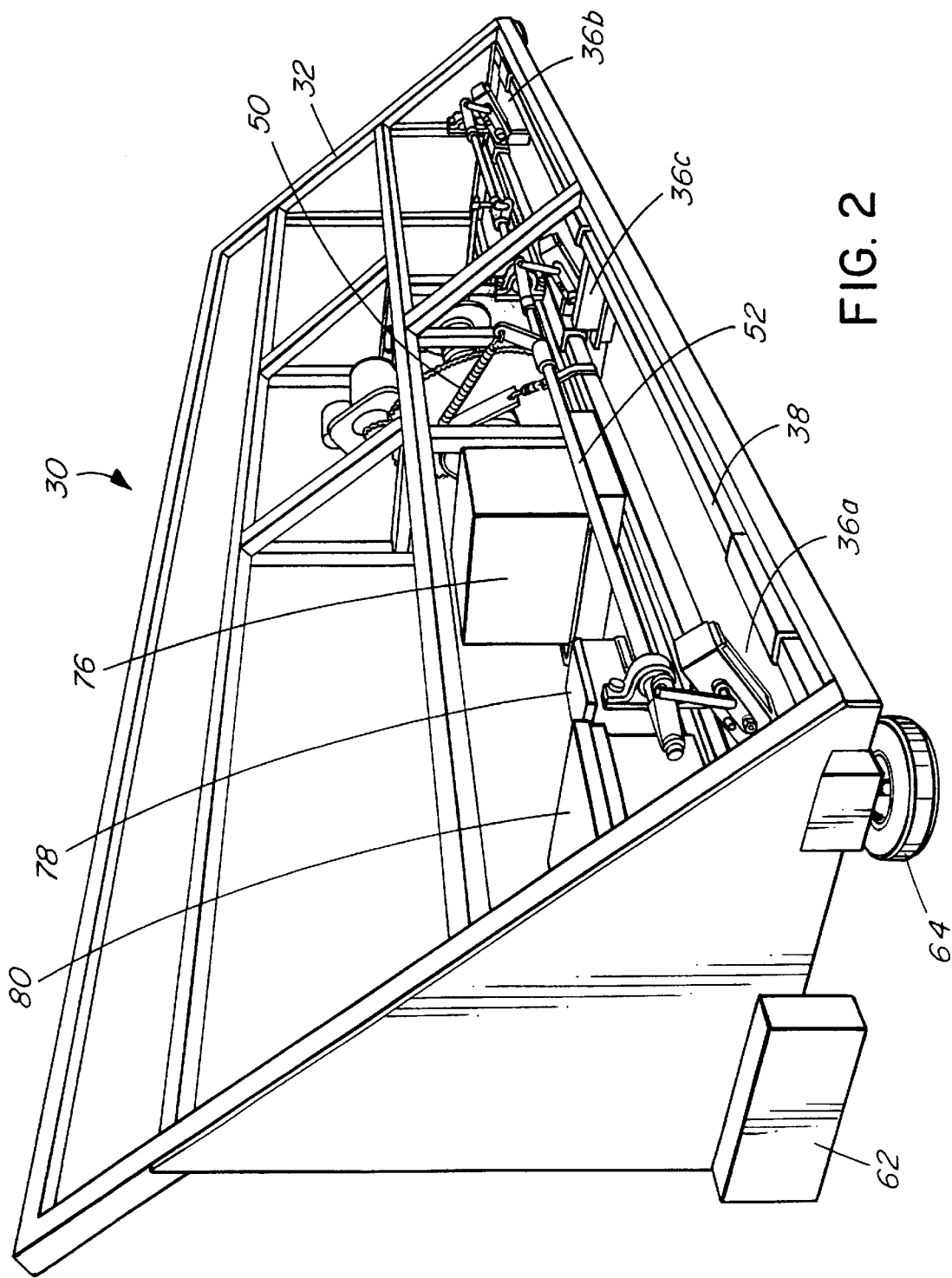
FIG. 2 is a perspective view of the sweeper of the floor cleaning system, showing some of the internal components of the sweeper.
Figure 3:
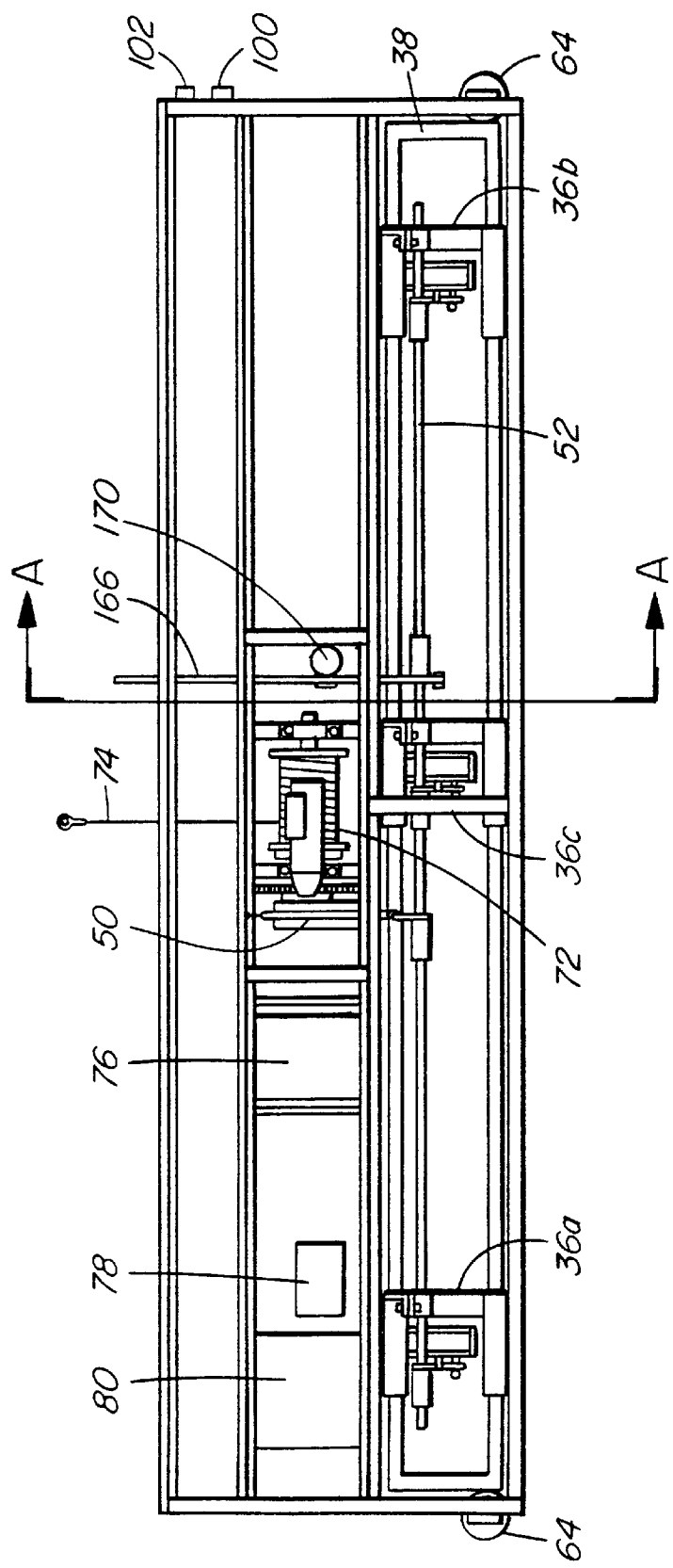
FIG. 3 is a top view of the sweeper shown in FIG. 2, showing more of the internal components of the sweeper.
Figure 6:
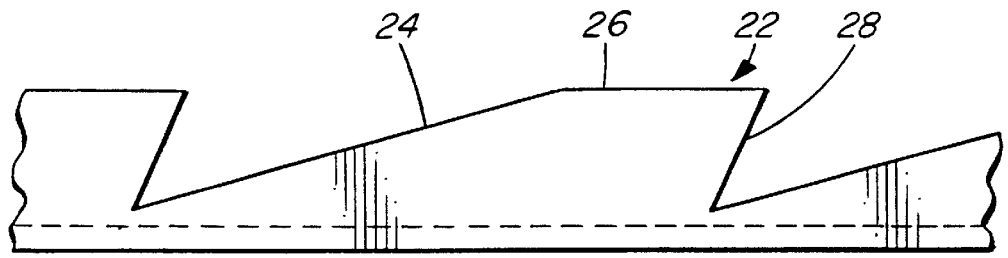
FIG. 6 is a close-up view of one of the teeth of one of the rails of the floor cleaning system.
Figure 10:
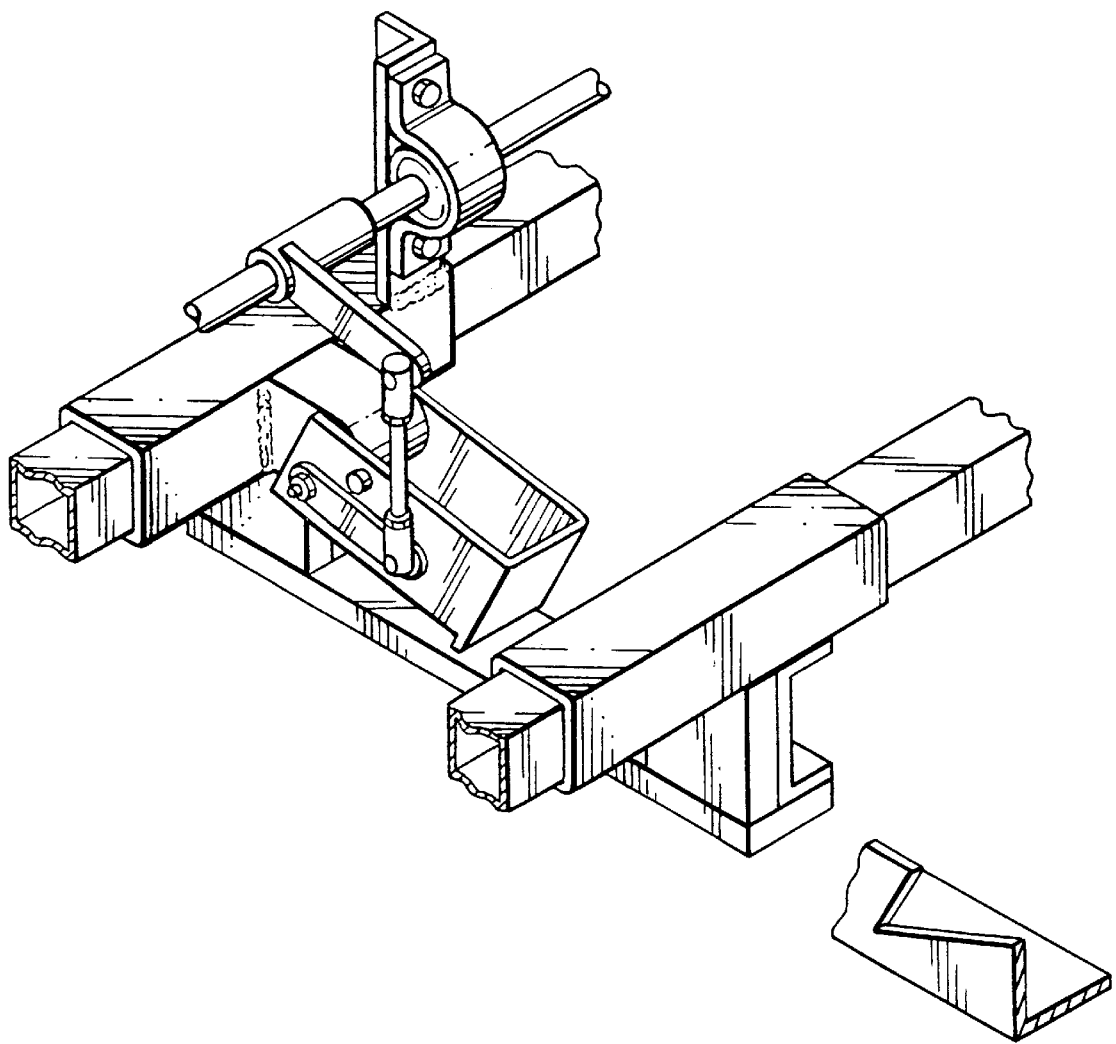
FIG. 10 is a close-up view of one of the skate assemblies of the invention.

As shown in FIGS. 2–4, contained within frame 32 are outer skate assemblies 36a, 36b and a central skate assembly 36c, each of which is fashioned to ride on a corresponding rail 20a, 20b and 20c. FIG. 10 illustrates a single skate assembly in greater detail. Specifically, skate assemblies 36a, 36b and 36c are slidably mounted on a chassis 38 which fits within frame 32 and which is bolted thereto. The lateral position of each of assemblies 36a, 36b and 36c on chassis 38 can be adjusted as necessary to allow for engagement of one rail by a corresponding assembly. A bolt may serve to tighten each of assemblies 36a, 36b and 36c into position. Lower portions of assemblies 36a, 36b and 36c extend downwardly from the lowest portion of frame 32 and rest upon rails 20a, 20b and 20c, lifting the main body of sweeper 30 clear of rails 20a, 20b and 20c.

Figure 9:
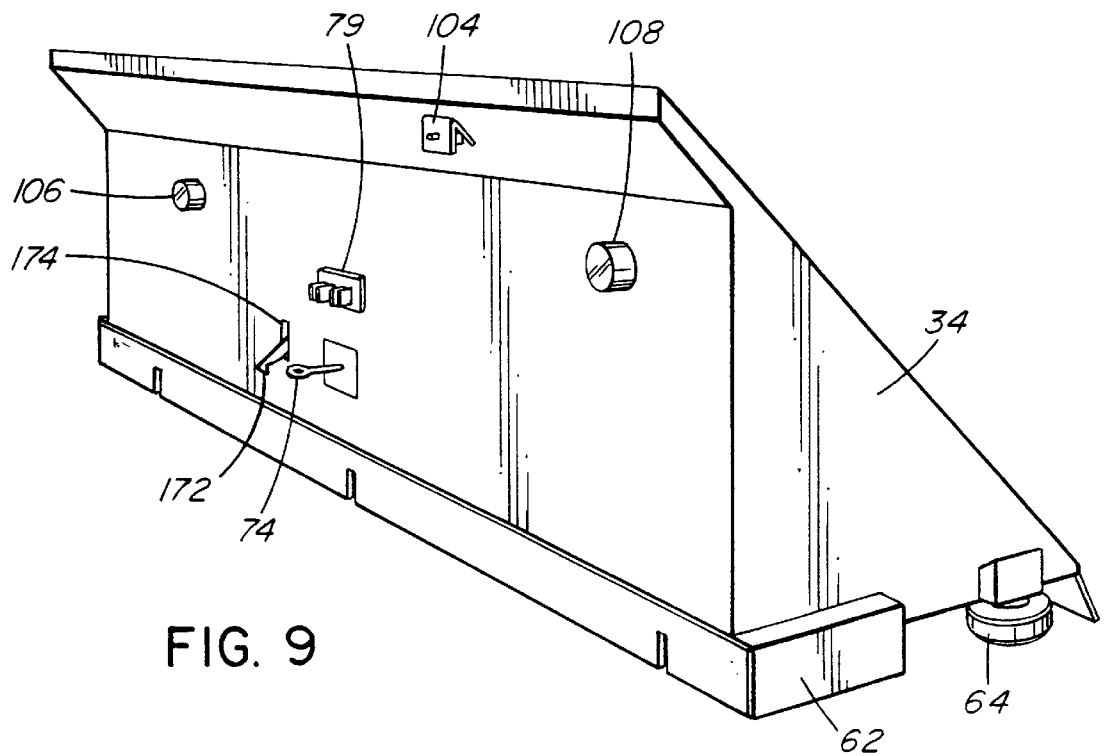
FIG. 9 is a rear perspective view of the sweeper of the invention.

To help stabilize sweeper 30 within trailer 10, left and right rear skids 62 and guide wheels 64 can also be affixed to sweeper 30 (FIGS. 2 and 9).

In one embodiment of the invention, skate assemblies 36a, 36b and 36c each comprise first and second sleeves 40, 42 (FIG. 10) slidably mounted on chassis 38, a skid plate 44 connecting sleeves 40, 42, and a pawl 46 pivotally mounted on an arm 48 extending inwardly from one of sleeves 40, 42. In central skate assembly 36c, skid plate 44 extends the entire depth of sweeper 30.

In a preferred embodiment, pawl 46 is mounted to face the rear 14 of trailer 10 (the pivot point is spaced toward the front 12 of trailer 10). In this manner, pawl 46 forms a pawl and ratchet arrangement with teeth 22 of respective rail 20a, 20b or 20c when sweeper 30 is mounted on rails 20a, 20b and 20c. Sweeper 30 skids along rails 20a, 20b and 20c on skid plates 44.

Pawl 46 is pivotable between 2 positions. The first is an engaged position wherein pawl 46 engages teeth 22 and is accordingly permitted to float in and out of the notches defined between teeth 22 as sweeper 30 moves rearwardly along the floor of trailer 10. The second is a disengaged position wherein pawl 46 is lifted clear of the tops of teeth 22. Pawl 46 is normally urged into the disengaged position by the force of spring 50 acting on a rod 52 connecting the three skate assemblies 36a, 36b and 36c.

Connecting rod 52 extends transversely across sweeper 30, passing through bushings 54 fastened onto upstanding members 41 on respective sleeves 42 of assemblies 36a, 36b and 36c. Connecting rod 52 itself bears three fixed sleeves 56 each having an arm 58 extending therefrom to overhang respective pawls 46. In each of assemblies 36a, 36b and 36c, a pin 59 connects arm 58 to a lift lever 60 pivotally mounted alongside pawl 46. A protrusion 62 protrudes from the side of pawl 46 and is fashioned to be caught by lift lever 60 when lever 60 is lifted. Thus, pawl 46 may be lifted by turning connecting rod 52, which lifts arm 58 and lifting lever 60 past the point of catching of protrusion 62.

Figure 11:
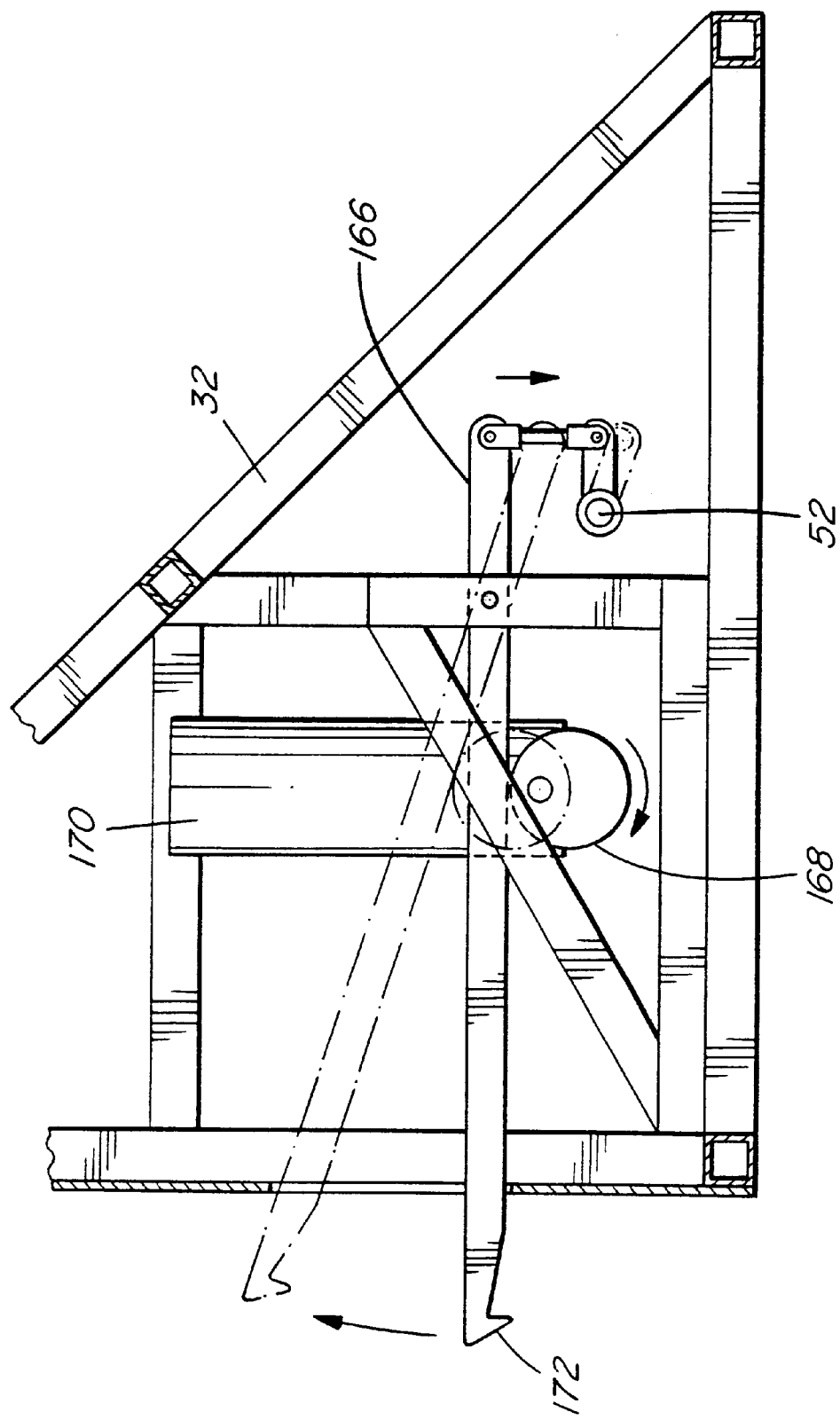
FIG. 11 is partial cross-sectional view of the frame of sweeper of invention, taken along line A—A of FIG. 3.

Connecting rod 52 is also coupled, with a similar sleeve affixed to it, to an end of a pivoted lever 166 (FIG. 11). Lever 166 is pivotable between a first position, in which connecting rod 52 is turned in a manner to allow pawls 46 to drop into an engaged position, and a second position, wherein pawls 46 are lifted out of the engaged position, as previously described. Lever 166 may be pivoted between these first and second positions by supporting a portion of lever 166 with a wheel 168 mounted d eccentrically on a drive shaft of an electric motor 170. It may be noted that the action of spring 50 upon connecting rod 52 urges lever 166 against the surface of wheel 168.

It will be appreciated that the end of lever 166 opposite that end which is coupled to connecting rod 52 moves upwardly when the coupled end moves downwardly, and vice versa. When control system 80 signals motor 170 to "raise" pawls 46, motor 170 turns wheel 168 to a "down" position, as shown in solid line in FIG. 11, which lowers one end of lever 166 and raises the end of lever 166 which is coupled to connecting rod 52. This allows pawls 46 to be urged into a disengaged position. When control system 80 signals motor 170 to "lower" pawls 46, motor 170 turns wheel 168 to an "up" position which lowers the coupled end of lever 166, as shown in outline in FIG. 11, turning connecting rod 52 enough to allow pawls 46 to drop into an engaged position.

If lever 166 is fashioned to extend through the rear wall of sweeper 30 through a slit 174 and to have a hook 172 on an outer end, as shown, lever 166 can also act as a locking mechanism, in combination with a loop fashioned onto front wall 12 of trailer 10, for locking sweeper 30 when not in use.

In operation, with a load in trailer 10, sweeper 30 is normally positioned at the front end 12 of trailer 10, taking the place of a typical bulkhead. The truck operator begins unloading the load from trailer 10 by operating a control system controlling the reciprocating floor system 18.

To begin the unloading cycle, all slats of floor system 18 move rearwardly towards the rear 14 of trailer 10. As described earlier, slat sets 1, 2 and 3 take turns moving forwardly under the load, and then all slats move rearwardly in unison once again, carrying the load rearwardly. In this manner, the load is "walked" in discrete steps out the back of trailer 10.

After enough of the load has been moved from the front of the trailer to the rear (ie. after there is only residual material immediately rearward of sweeper 30), a signal is provided by the operator to a control system 80 contained within sweeper 30 to begin to clean the residual material behind the advancing load by engaging sweeper 30. It has been found that in operation this is most effectively accomplished once the load is approximately 1 metre away from the front face of the unit, which may be approximately 2 minutes into the unload cycle.

This signal causes pawls 46, which are normally in an "up", or unengaged, position to be forced into their engaged positions. As all slat sets move rearwardly, teeth 22 on rails 20a, 20b and 20c move rearwardly, and pull against pawls 46, pulling sweeper 30 rearwardly along therewith.

Figure 7:
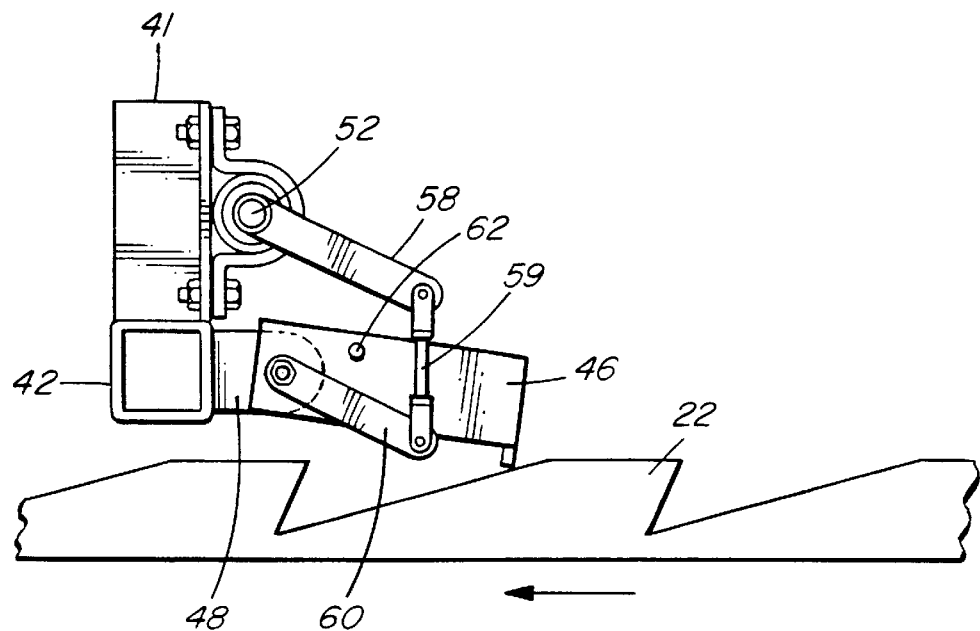
FIGS. 7 and 8 illustrate the ratcheting action of a pawl on the tooth shown in FIG. 6.
Figure 8:
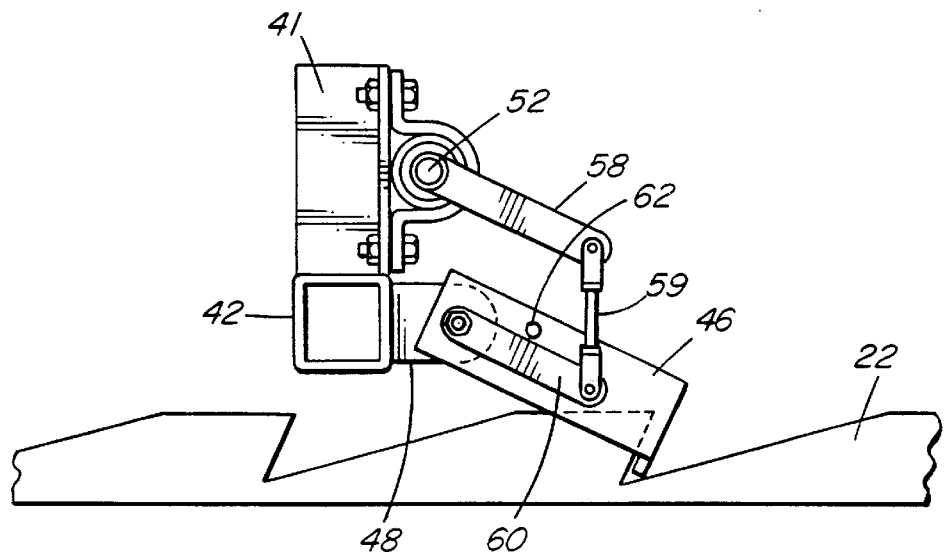

As slat set "1" moves forwardly relative slats "2" and "3" (and relative the load and the sweeper), the outer pawls are forced upwardly by the gradually sloping portion 24 of teeth 22 of rails 20a and 20b, and slide along horizontal portion 26 of teeth 22 until settling into the steeply sloping portion 28 of the adjacent tooth 22, once slats "1" have moved forward to their forward limit. This is illustrated in FIG. 7 and 8. Not shown in these figures, however, is the skid plate 44 connecting and extending downwardly from sleeves 42 and 40.

When the next set of slats, "2", moves forwardly relative the remainder of the slats, they slide underneath sweeper 30 and do not cause any movement of sweeper 30. Then, when slat set "3" moves forwardly, the central pawl 46 similarly follows the rail 20c and eventually falls into the next rearward notch in the central rail. The sweeper is then pulled rearwardly, when all the slats again move rearwardly together, thereby sweeping along with it the residual material. In this way, sweeper 30 ratchets itself in discrete steps along the length of the trailer floor.

Once sweeper 30 reaches an end position, which may be sensed by a rear position sensor 100 attached to sweeper 30, the control system 80 sends a signal to motor 170 to turn wheel 168 to manipulate lever 166 to lift pawls 46 clear of teeth 22. An electric winch 72 is provided in a preferred embodiment to winch sweeper 30 back to its normal starting, position at the front 12 of trailer 10. Winch 72 bears a cable 74 which extends through the back face of sweeper 30 and which attaches to front 12 of trailer 10.

Winch 72 and motor 170 are conveniently powered by a rechargeable battery 76 contained within sweeper 30. A recharging system 78 is also provided to keep battery 76 charged. Recharging system 78 preferably draws current from the electrical system of the truck towing trailer 10. This can be accomplished by fashioning a plug 79 into the rear of sweeper 30 and a corresponding socket (not shown) into front 12 of trailer 10.

A front position sensor 102 may also be provided within sweeper 30 to provide a signal to control system 80 when sweeper 30 has been winched to within a predetermined distance from front 12 of trailer 10. A mechanical deadman switch 104 can also be provided at the back of sweeper 30 to shut off all power to sweeper 30 when the rear of sweeper 30 contacts the front 12 of trailer 10. This switch can also be tripped by an operator in an emergency.

In the preferred embodiment, front and rear position sensors 100, 102 are contained within rear skids 62, but it will be appreciated that other locations within sweeper 32 are suitable.

A speed control system may also be added to control system 80, allowing winch 72 to winch sweeper 30 at a fast rate initially, slowing down as sweeper 30 is drawn nearer front 12.

Other safety features may be added to sweeper 30. For example, a strobe light 106 and audible alarm 108 may be added to warn of the sweeper's activation or its relative position. A further safety switch preventing winch operation when pawl 46 are in engagement may also be employed.

It will be appreciated to those skilled in the art that control system 80 may incorporate integrated circuitry programmed to accept signals from various sources including sensors and switches, and to provide signals to the winch 72, the motor 170 and the various sensors and switches.

Many trucks carrying wood chips, saw dust and the like are often unloaded by "tipping". A truck will drive onto a large hydraulic lift which will tip the entire trailer 10, allowing the load to fall out the rear 14 by gravity. A switch such as a mercury switch which detects the tipping of trailer 10 beyond a certain angle, may be provided on sweeper 30 to lock winch 72 so that sweeper 30 remains in place in trailer 30 when it is unloaded in this fashion. Of course, if lever 166 is fashioned with hook 172, this will also help to prevent sweeper 30 from spilling out of trailer 10.

Sweeper 30 does not push the load itself, but rather follows the load out the rear 14 of trailer 10, and collects the residual material at its front face. Sweeper 30 is most effective when provided with a skirt 68 (FIG. 5) extending outwardly from a portion of the perimeter of the frame 32. Skirt has slits 70 to allow rails 20a, 20b and 20c to pass therethrough.

It has been found useful to face all sliding surfaces with high molecular weight (UHMW) plastic to reduce friction and to resist abrasion and wear. For example, UHMW is used on skid plates 44 and on the front face of pawls 46.

As will be apparent to those skilled in the art in the light of the foregoing disclosure, many alterations and modifications are possible in the practice of this invention without departing from the spirit or scope thereof. For example, various types of switches and sensors might be suitably employed in place of those described herein without departing from the invention. Similarly, motive means other than a winch may be employed to return sweeper 30 to its staring position. Other such modifications are contemplated by the inventor. Accordingly, the scope of the invention is to be construed in accordance with the substance defined by the following claims.

What is claimed is:

1. A trailer floor cleaning system for use in a self-unloading trailer having a front, a rear, side walls, and a reciprocating floor conveyor system having a plurality of reciprocable slats, comprising:

a) a plurality of rails each extending upwardly from the top surface of one of said plurality of slats, each rail comprising an angle having a flat horizontal portion for attachment to the top surface of a slat and a substantially vertical portion attached to said horizontal portion and extending upwardly therefrom, each rail defined by a plurality of contiguously-aligned fin-like teeth defining notches between adjacent ones of them; and b) a wedge-shaped sweeper mounted on said rails comprising a frame, a covering attached to said frame and enclosing it, a plurality of skate assemblies each attached to a lower portion of said frame and depending downwardly therefrom, each of said assemblies fashioned to slide along one of said rails, and motive means for moving said sweeper from the front of said trailer towards the rear of said trailer along said rails.

2. A trailer floor cleaning system as claimed in claim 1 wherein said skate assemblies comprise pivotable pawls and said motive means for moving said sweeper from the front of said trailer towards the rear of said trailer along said rails comprises said pawls ratchetingly engaging said teeth of said rails.

3. A trailer floor cleaning system as claimed in claim 2 wherein said plurality of rails comprises a central rail extending upwardly from the top surface of a central slat, and two outer rails, each extending upwardly from the top surface of an outer slat near a side wall of said trailer, wherein said outer slats when in operation reciprocate in unison with one another, but out of unison with said central slat.

4. A trailer floor cleaning system as claimed in claim 1 wherein said teeth comprise a gently upwardly sloping portion, a horizontal portion, and a steeply sloping portion formed at an obtuse angle to said horizontal portion.

5. A trailer floor cleaning system as claimed in claim 4 further comprising return motive means for moving said sweeper from the rear of said trailer to the front of said trailer.

6. A trailer floor cleaning system as claimed in claim 5 wherein said return motive means comprises a winch attached to said frame.

7. A trailer floor cleaning system as claimed in claim 6 further comprising a rechargeable battery and a recharging system for said battery.

8. A trailer floor cleaning system as claimed in claim 7 further comprising rear skids affixed to the sides of said frame, and guide wheels affixed to the sides of said frame.

9. A trailer floor cleaning system as claimed in claim 8 wherein said covering further comprises a skirt extending outwardly from a portion of the perimeter of said frame.

* * * * *